US010936618B2

(12) United States Patent
Apple et al.

(10) Patent No.: US 10,936,618 B2
(45) Date of Patent: Mar. 2, 2021

(54) SYSTEMS AND METHODS FOR MANAGING AVIATION RECORDS

(71) Applicant: General Electric Company, Schenectady, NY (US)

(72) Inventors: Heather Lynne Apple, Mason, OH (US); Matthew Emery, Winchester (GB); Nathaniel Hicks, Loveland, OH (US); James Destro, Dublin, CA (US); Jeff Schwab, Austin, TX (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 15/800,535

(22) Filed: Nov. 1, 2017

(65) Prior Publication Data

US 2018/0129721 A1    May 10, 2018

Related U.S. Application Data

(60) Provisional application No. 62/418,860, filed on Nov. 8, 2016.

(51) Int. Cl.
*G06F 16/25* (2019.01)
*G06Q 10/06* (2012.01)
*G06N 20/00* (2019.01)
*G06Q 10/00* (2012.01)

(52) U.S. Cl.
CPC .......... *G06F 16/258* (2019.01); *G06N 20/00* (2019.01); *G06Q 10/06395* (2013.01); *G06Q 10/20* (2013.01)

(58) Field of Classification Search
CPC ..................................................... G06F 16/25
See application file for complete search history.

(56) References Cited

U.S. PATENT DOCUMENTS

| | | | |
|---|---|---|---|
| 7,689,329 B2 | 3/2010 | Avery et al. | |
| 7,761,200 B2 | 7/2010 | Avery et al. | |
| 8,423,430 B2 | 4/2013 | Avery et al. | |
| 8,645,148 B2 | 2/2014 | Small et al. | |
| 8,694,196 B1 | 4/2014 | Doulatshahi et al. | |
| 9,008,868 B1 | 4/2015 | Bantoft et al. | |
| 9,237,022 B2 * | 1/2016 | Kimberly | G06F 21/57 |
| 9,334,063 B2 * | 5/2016 | Baumgarten | G05B 23/0216 |
| 2003/0109973 A1 * | 6/2003 | Hensey | H04L 63/0853 |
| | | | 701/32.6 |

(Continued)

*Primary Examiner* — Kurtis Gills
(74) *Attorney, Agent, or Firm* — Dority & Manning, P.A.

(57) ABSTRACT

Systems and methods for managing and/or exchanging aviation records are provided. One example aspect is directed to a method that includes receiving, at one or more processors, an aviation record in a first format from a first computing system. The method includes performing, at the one more processors, a quality assurance procedure on the aviation record in the first format based on historical data. The method includes determining, at the one or more processors, whether the aviation record in the first format is valid based on the quality assurance procedure. The method includes selectively translating, at the one or more processors, the aviation record into a standardized format based on whether the aviation record in the first format is valid. The method includes storing, at the one or more processors, the aviation record in the standardized format if the aviation record in the first format is valid.

18 Claims, 9 Drawing Sheets

(56) References Cited

U.S. PATENT DOCUMENTS

| | | | |
|---|---|---|---|
| 2005/0246240 A1* | 11/2005 | Padilla | G06Q 10/06 |
| | | | 705/26.3 |
| 2009/0048883 A1* | 2/2009 | Kelly | G06Q 10/063 |
| | | | 705/30 |
| 2015/0051786 A1* | 2/2015 | Wang | B64F 5/60 |
| | | | 701/29.4 |
| 2015/0100943 A1* | 4/2015 | Gabel | G06Q 30/02 |
| | | | 717/106 |
| 2017/0006135 A1 | 1/2017 | Siebel et al. | |
| 2017/0192414 A1 | 7/2017 | Mukkamala et al. | |
| 2017/0235796 A1* | 8/2017 | Vali | G06N 20/00 |
| | | | 706/11 |

\* cited by examiner

```
                    500
                      ↘

┌─────────────────────────────────────────┐
        │ RECEIVE AN AVIATION RECORD IN A FIRST   │
        │        FORMAT FROM A FIRST              │
        │           COMPUTING DEVICE              │
        │                  502                    │
        └─────────────────────────────────────────┘
                          │
                          ▼
        ┌─────────────────────────────────────────┐
        │  TRANSLATE THE AVIATION RECORD INTO A   │
        │             SECOND FORMAT               │
        │                  504                    │
        └─────────────────────────────────────────┘
                          │
                          ▼
        ┌─────────────────────────────────────────┐
        │ STORE THE AVIATION RECORD IN THE SECOND │
        │                 FORMAT                  │
        │                  506                    │
        └─────────────────────────────────────────┘
                          │
                          ▼
        ┌─────────────────────────────────────────┐
        │  RECEIVE A REQUEST FOR THE AVIATION     │
        │  RECORD IN A THIRD FORMAT FROM A        │
        │         SECOND COMPUTING DEVICE         │
        │                  508                    │
        └─────────────────────────────────────────┘
                          │
                          ▼
        ┌─────────────────────────────────────────┐
        │  TRANSLATE THE AVIATION RECORD INTO     │
        │            THE THIRD FORMAT             │
        │                  510                    │
        └─────────────────────────────────────────┘
                          │
                          ▼
        ┌─────────────────────────────────────────┐
        │ TRANSMIT THE AVIATION RECORD IN THE     │
        │  THIRD FORMAT TO THE SECOND COMPUTING   │
        │                 DEVICE                  │
        │                  512                    │
        └─────────────────────────────────────────┘
```

FIG. 5

SYSTEMS AND METHODS FOR MANAGING AVIATION RECORDS

PRIORITY CLAIM

The present application claims the benefit of priority of U.S. Provisional Patent Application No. 62/418,860, entitled "SYSTEMS AND METHODS FOR MANAGING AVIATION RECORDS," filed Nov. 8, 2016, which is incorporated herein by reference for all purposes.

FIELD

The present subject matter relates generally to aviation records.

BACKGROUND

An airline can track information, such as a component replacement on an airplane, by having an employee manually enter an aviation record. The entered aviation record will have a format consistent with a system used by the airline. The airline can share the aviation record with another party, such as a maintenance, repair, and overhaul (MRO) entity. If the MRO entity uses a second system requiring a second format, the aviation record will need to be translated into the second format before the MRO entity can use the aviation record.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a system, comprising one or more processors and one or more memory devices. The one or more memory devices store computer-readable instructions that when executed by the one or more processors cause the one or more processors to perform operations. The operations include receiving, at one or more processors, an aviation record in a first format from a first computing system. The operations include performing, at the one more processors, a quality assurance procedure on the aviation record in the first format based at least in part on historical data associated with one or more components of one or more aerial vehicles. The operations include determining, at the one or more processors, whether the aviation record in the first format is valid based on the quality assurance procedure. The operations include selectively translating, at the one or more processors, the aviation record into a standardized format based on whether the aviation record in the first format is valid. The operations include storing, at the one or more processors, the aviation record in the standardized format in response to a determination that the aviation record in the first format is valid.

Another example aspect of the present disclosure is directed to a method. The method includes receiving, at one or more processors, a plurality of aviation records having a plurality of formats. The method includes identifying, at the one or more processors, a subset of the plurality of aviation records associated with a component. The method includes applying, at the one or more processors, machine learning to aggregate information from the subset of aviation records into a standardized format, wherein the subset of aviation records includes two or more aviation records having different formats. The method includes creating, at the one or more processors, a configuration management record that identifies a history of the component using the standardized format for the information from the subset of aviation records.

Another example aspect of the present disclosure is directed to a non-transitory computer-readable medium storing computer instructions, that when executed by one or more processors, cause the one or more processors to perform operations. The operations include receiving, at one or more processors, a plurality of aviation records associated with a plurality of components. The operations include applying, at the one or more processors, machine learning to identify for each component, a subset of the plurality of aviation records corresponding to the component. The operations include creating, at the one or more processors, a profile for each component based on aggregating the aviation records from the corresponding subset associated with the component.

Other example aspects of the present disclosure are directed to systems, methods, airlines, devices, and non-transitory computer-readable media for managing aviation records. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts a flow diagram of an example method according to example embodiments of the present disclosure;

DETAILED DESCRIPTION

Figure 1:
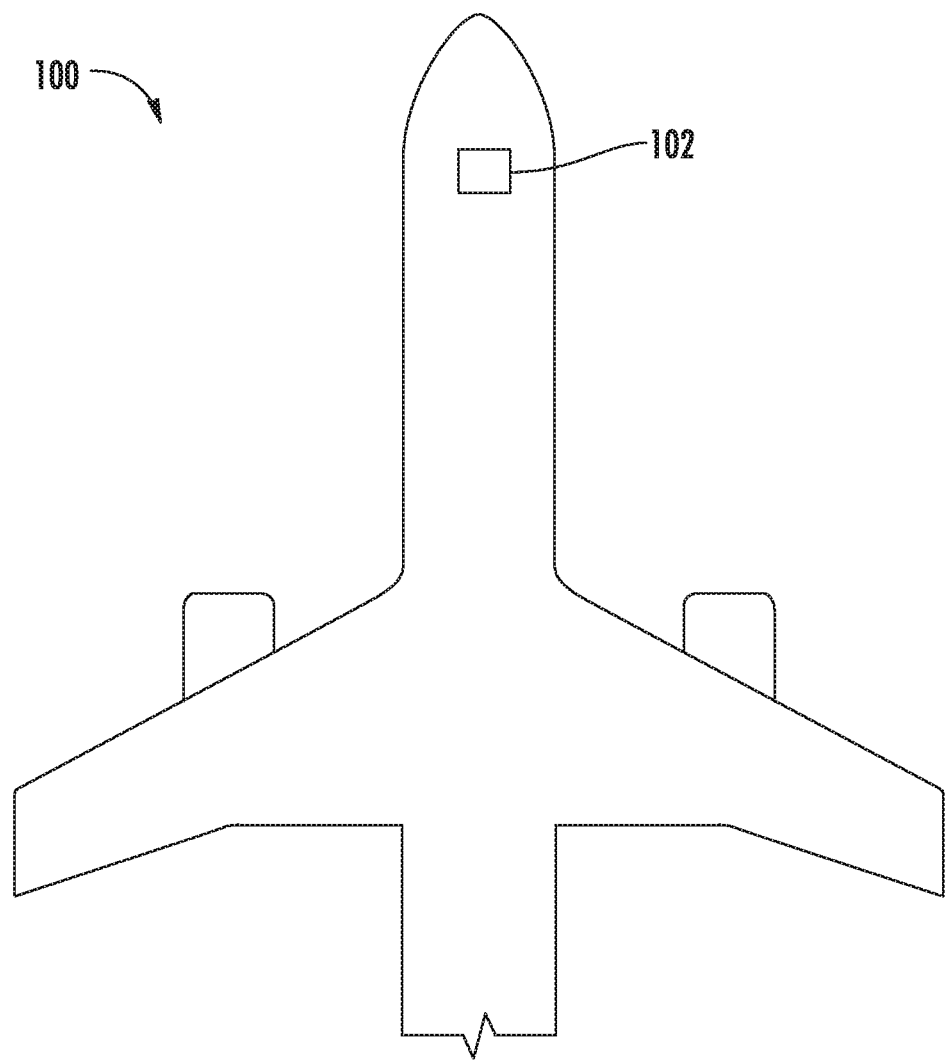
FIG. 1 depicts an example aerial vehicle and aerial vehicle component in accordance with example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to managing aviation records. In example embodiments, managing aviation records can include exchanging or facilitating the exchange of aviation records. An aviation record can include components (e.g., parts, assets, etc.) data, including history, maintenance data, configuration data, etc. An aviation record can be generated by an owner and/or operator of an aerial vehicle. An aviation record can be generated by an entity that provides maintenance, repairs, and/or part replacements for aerial vehicles. An aviation record can also be generated by an original equipment manufacturer (OEM), a lessor, or a parts broker. An aviation record can be generated in any number of formats. For example, various formats for aviation records that include XML metadata content, spreadsheet files, borescope inspection videos, and digitized paper records can be used.

A centralized computing system can receive a plurality of aviation records in a plurality of formats. A computing system can include one or more computing devices. The centralized computing system can translate the plurality of aviation records in a plurality of formats into a standard format. In another embodiment, a dedicated computing system can translate the plurality of aviation records before forwarding the translated aviation record to the centralized computing system. In yet another embodiment, each format can cause an aviation record to be routed to a particular computing system for translation, before the particular computing system forwards the translated aviation record to the centralized computing system. Once the centralized computing system translates the plurality of aviation records into the standard format and/or receives the translated aviation records, the centralized computing system can store the translated aviation records in a database.

The centralized computing system can perform analysis on the plurality of aviation records. For example, the centralized computing system can identify all of the plurality of aviation records associated with a particular component. The centralized computing system can use operations and analytics, such as machine learning techniques, to determine if the identified aviation records are a set of complete records for the particular component. When a determination is made that the identified aviation records are not a set of complete records for the particular component, the centralized computing system can send a request to an aviation customer (such as an airline, an aerial vehicle lessor, etc.) and/or an aviation supplier (such as a maintenance, repair, and overhaul (MRO) entity, an original equipment manufacturer (OEM), a parts broker, etc.) associated with the particular component to help fill the gaps. The records for the particular component can be used to notify an aviation customer and/or aviation supplier associated with the particular component of when the particular component is due for inspection, repair, and/or replacement. Using the aggregation of data from the plurality of aviation records of a plurality of components, the centralized computing system can use operations, such as machine learning techniques, to determine which brand of component performs best, to determine if a recommendation for when to replace a component should change, to determine which maintenance routine is best for a component, etc.

The centralized computing system can receive a request for one of the plurality of stored aviation records from a requesting computing system in a new format other than the standard format. The centralized computing system can translate the requested stored aviation record in the standard format into the new format. In another embodiment, a dedicated computing system can translate the requested stored aviation record before forwarding the translated aviation record to the requesting computing system. In yet another embodiment, each format can cause an aviation record to be routed to a particular computing system for translation, before the particular computing system forwards the translated aviation record to the requesting computing system. Once the centralized computing system and/or another computing system translates the requested stored aviation record into the new format, the newly translated aviation record can be forwarded to the requesting computing system.

Before the centralized computing system and/or the requesting computing system receives an aviation record, a quality assurance operation can be performed. The quality assurance operation can ensure that an aviation record of a particular format has the right syntax. For example, if a certain field of a particular format should only have numerals, and a letter is detected, then the quality assurance operation can notify the provider of the aviation record of the error. The quality assurance operation can ensure consistency with history or requested compliance. For example, if an aviation record indicates a new component to replace an old component, a check can be made if the new component indicated by the aviation record is of a type appropriate or as requested to replace the old component. As a further example, if an engine is being replaced, and the aviation record received indicates that the new component is a radio, a notification can be made of an entry error to the provider of the aviation record.

In some embodiments, the quality assurance operation includes a user interface configured to provide an indication of any variances, incompatibilities, or other discrepancies between the standard format of the centralized computing system and a format of the particular computing system requesting or transmitting the documents. In some examples, a web-based user interface is provided that displays discrepancies between the two systems of record. The interface collates the structured configuration data in a part hierarchy, and provides integrated access to the digital documents. Integrated access to the digital documents using structured configuration data can meet regulatory compliance requirements for the aviation industry.

In some embodiments, machine learning is applied to combine historical data and/or validation constraints as part of a quality assurance operation. The historical data may be associated with one or more components of one or more aerial vehicles. In one example, the historical data may include earlier received aviation records or data from the earlier received aviation records for the component(s). Machine learning can be applied to determine a format and/or other information associated with a component or component type. Disparate records from multiple sources can be analyzed using machine learning to determine formats associated with each of the sources and to correlate data between the different formats. When a new record is received, machine learning can be applied to determine if the received record is valid. For example, the new record can be analyzed to determine if it contains information corresponding to the format of previous records.

In some embodiments, machine learning is applied to identify components and/or component types. An aviation record may be received without a known format. Machine learning can analyze the aviation record to identify a component corresponding to the aviation record.

In this way, the systems and methods according to example aspects of the present disclosure can have a technical effect of allowing aviation records kept in one format to be easily sent to a party expecting aviation records in another format. Additionally, centralized aviation records allows for the tracking of a lifetime of a component. Further, aggregated tracking of a plurality of components yields data about expected useful lifetime of future components.

Machine learning is applied to increase the efficiency and ability of computing systems to process disparate records from multiple heterogeneous sources. The format or structure of records associated with particular components, component types, sources can be determined. In this manner, the computing system can apply machine learning results to determine information about unknown records, such as a format or structure of the records. A standardized format is utilized so that records can be aggregated to provide representations of the history of a component. The computing system is specifically configured to process disparate records, analyze features of records, and to apply the analysis to facilitate the exchange of records using the computing system. A technical effect to increase the efficiency of the computing system and to provide the capability to process records of different and unknown formats is provided.

One example aspect of the present disclosure is directed to a method for managing and/or exchanging aviation records. The method includes receiving, at one or more processors, an aviation record in a first format from a first computing system; translating, at the one or more processors, the aviation record into a second format; storing, at the one or more processors, the aviation record in the second format; receiving, at the one or more processors, a request for the aviation record in a third format from a second computing system; translating, at the one or more processors, the aviation record into the third format; and transmitting, at the one or more processors, the aviation record in the third format to the second computing system.

In one example aspect of the method, the second format is a format in accordance with a standard.

In one example aspect of the method, one or more of the first computing system and the second computing system is operated by an airline.

In one example aspect of the method, one or more of the first computing system and the second computing system is operated by a maintenance, repair, and overhaul (MRO) entity.

In one example aspect of the method, receiving the aviation record in the first format from the first computing system further comprises: performing a quality assurance procedure on the aviation record in the first format, wherein the quality assurance procedure determines if the aviation record in the first format is valid; when the quality assurance procedure determines that the aviation record in the first format is not valid, transmitting a notification to the first computing system; and when the quality assurance procedure determines that the aviation record in the first format is valid, proceeding with translating the aviation record into the second format.

In one example aspect of the method, the quality assurance procedure ensures that a syntax of the received aviation record matches an expected syntax of the first format.

In one example aspect of the method, transmitting the aviation record in the third format to the second computing system further comprises: performing a quality assurance procedure on the aviation record in the third format, wherein the quality assurance procedure determines if the aviation record in the third format is valid; when the quality assurance procedure determines that the aviation record in the third format is not valid, creating a notification; and when the quality assurance procedure determines that the aviation record in the third format is valid, transmitting the aviation record in the third format to the second computing system.

In one example aspect of the method, the quality assurance procedure ensures that a syntax of the aviation record matches an expected syntax of the third format.

One example aspect of the present disclosure is directed to a method for managing and/or exchanging aviation records comprising: receiving, at one or more processors, a plurality of aviation records, wherein each of the aviation records is associated with a component; creating, at the one or more processors, a profile for each component, wherein each profile for a component comprises the aviation records associated with the component; and grouping, at the one or more processors, the profiles by a criterion.

In one example aspect of the method, the criterion is a type of component, and wherein each profile in a group is associated with a same type of component.

In one example aspect, the method further comprises analyzing, at the one or more processors, a performance of each component in a group of profiles based on the profiles associated with the group of profiles; and updating, at the one or more processors, an expected life of the type of component associated with the group based on the analyzed performances.

In one example aspect, the method further comprises receiving, at the one or more processors, a new aviation record from a remote computing system, wherein a replacement component associated with the new aviation record is to replace an old component associated with an old profile; determining, at the one or more processors, if the replacement component is appropriate to replace the old component based on the old profile; when the replacement component is determined to not be appropriate to replace the old component, transmitting a notification to the remote computing system; and when the replacement component is determined to be appropriate to replace the old component, creating, at the one or more processors, a new profile associated with the replacement part.

One example aspect of the present disclosure is directed to a system for managing and/or exchanging aviation records comprising: one or more processors configured to: receive a plurality of aviation records; identify each of the plurality of aviation records associated with a component; and create a history of the component based on the aviation records associated with the component.

In one example aspect of the system, the one or more processors are further configured to: identify one or more gaps in the history of the component; determine one or more parties associated with the component; and transmit one or more requests to fill the one or more gaps in the history of the component to the one or more parties associated with the component.

In one example aspect of the system, the one or more processors are further configured to: receive information to fill at least one of the identified gaps in the history of the component from at least one of the one or more parties associated with the component; and update the history of the component to fill the at least one gap in the history of the component with the information received from the at least one of the one or more parties associated with the component.

In one example aspect of the system, the one or more processors are further configured to: receive information to fill the identified gaps in the history of the component from at least one of the one or more parties associated with the component; and complete the history of the component to fill the gaps in the history of the component with the information received from the at least one of the one or more parties associated with the component.

In one example aspect of the system, the one or more processors are further configured to: estimate a remaining life of the component based on the history of the component.

In one example aspect of the system, the one or more processors are further configured to: receive a new aviation record from a remote computing system; determine that the new aviation record is associated with the component; and update the history of the component based on the new aviation record.

In one example aspect of the system, the one or more processors are further configured to: perform a quality assurance procedure on the new aviation record, wherein the quality assurance procedure determines if the new aviation record is valid; when the quality assurance procedure determines that the new aviation record is not valid, transmit a notification to the remote computing system and halt operation; and when the quality assurance procedure determines that the new aviation record is valid, proceed.

In one example aspect of the system, the quality assurance procedure ensures that each field of the new aviation record is consistent with the history of the component.

One example aspect of the present disclosure is directed to a system for managing and/or exchanging aviation records comprising: one or more processors configured to: receive a plurality of aviation records, wherein each of the aviation records is associated with a component; create a profile for each component, wherein each profile for a component comprises the aviation records associated with the component; and group the profiles by a criterion.

In one example aspect of the system, the criterion is a type of component, and wherein each profile in a group is associated with a same type of component.

In one example aspect of the system, the one or more processors are further configured to: analyze a performance of each component in a group of profiles based on the profiles associated with the group of profiles; and update an expected life of the type of component associated with the group based on the performances of each component in the group of profiles.

In one example aspect of the system, the one or more processors are further configured to: receive a new aviation record from a remote computing system, wherein a replacement component associated with the new aviation record is to replace an old component associated with an old profile; determine if the replacement component is appropriate to replace the old component based on the old profile; when the replacement component is determined to not be appropriate to replace the old component, transmit a notification to the remote computing system; and when the replacement component is determined to be appropriate to replace the old component, create a new profile associated with the replacement part.

FIG. 1 depicts an example aerial vehicle 100 and aerial vehicle component 102 in accordance with example embodiments of the present disclosure. The aerial vehicle 100 can be, for example, an airplane in a fleet of an aviation customer, such as an airline or an aerial vehicle lessor. The aerial vehicle component 102 can be any component (e.g., part, asset, etc.) associated with the aerial vehicle 100. An aviation record can be created when the aerial vehicle component 102 is installed, configured, reconfigured, serviced, repaired, replaced, purchased, sold and/or transferred in ownership.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
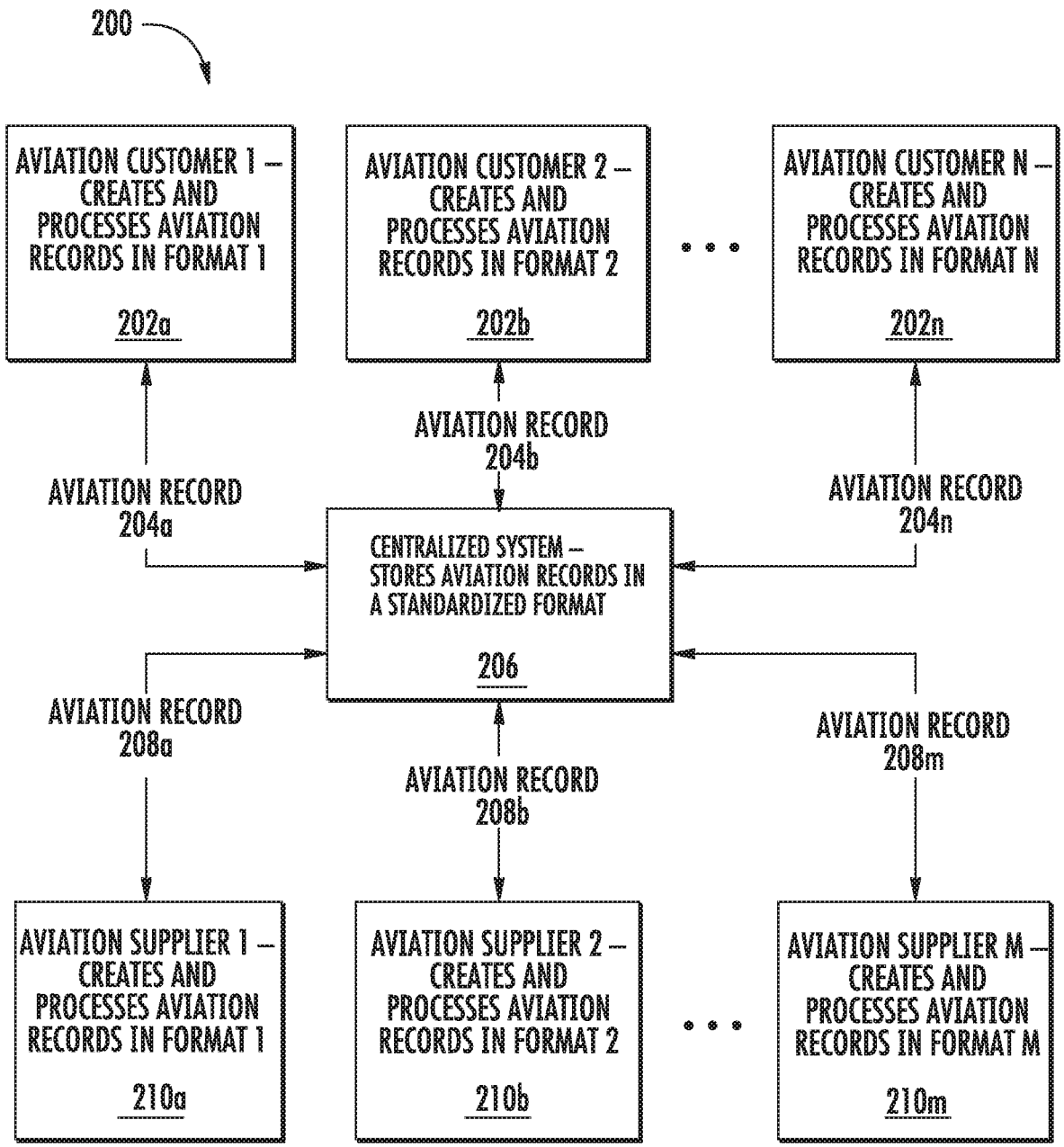
FIG. 2 depicts an example block diagram of a system in accordance with example embodiments of the present disclosure.

FIG. 2 depicts an example block diagram of a system 200 in accordance with example embodiments of the present disclosure. The system 200 can have one or more aviation customer (such as an airline and/or an aerial vehicle lessor) servers 202a, 202b, 202n, wherein each aviation customer server 202a, 202b, 202n can process aviation records in at least one format. An aviation record can be, for example, related to a component of an aerial vehicle in an aviation customer's fleet. The system 200 can have one or more aviation supplier (a maintenance, repair, and overhaul (MRO) entity, an original equipment manufacturer (OEM), a parts broker, etc.) servers 210a, 210b, 210m, wherein each aviation supplier server 210a, 210b, 210m can process aviation records in at least one format. An aviation record can be, for example, related to a component of an aerial vehicle manufactured by an original equipment manufacturer (OEM) or serviced by an MRO entity.

The one or more aviation customer servers 202a, 202b, 202n can transmit one or more aviation records 204a, 204b, 204n in one or more formats to a centralized system 206. The centralized system 206 can translate the one or more aviation records 204a, 204b, 204n into a standardized format prior to storing the one or more aviation records 204a, 204b, 204n. The one or more aviation supplier servers 210a, 210b, 210m can transmit one or more aviation records 208a, 208b, 208m in one or more formats to a centralized system 206. The centralized system 206 can translate the one or more aviation records 208a, 208b, 208m into a standardized format prior to storing the one or more aviation records 204a, 204b, 204n.

The centralized system 206 can perform a quality assurance procedure on the aviation records 204a, 204b, 204n, 208a, 208b, 208m prior to translating and storing the aviation records 204a, 204b, 204n, 208a, 208b, 208m to ensure that the aviation records 204a, 204b, 204n, 208a, 208b, 208m are valid. If the quality assurance procedure indicates that an aviation record, such as the aviation record 204a, is invalid, then the centralized system 206 can transmit a notification to a corresponding server, such as the aviation customer server 1 202a. The quality assurance procedure will be discussed in more detail below.

In example embodiments, centralized system 206 is configured to translate records received in any format, including unknown formats, to a standardized format. The system can use machine learning techniques to determine a format of aviation records and/or to identify particular portions of aviation records as corresponding to particular information types. The machine leaning results can be used to translate information from an aviation record into a standardized format. Additionally, machine learning can be used to determine validation constraints applied during a quality assurance procedure.

By way of example, the system may use machine learning to identify an information type for data within an aviation record based on the location, field, format, contextual data, or other information associated with the data. Information types may include a sender identification, a part number, a date, a shipping reference number, a description, etc. The system may use machine learning to associate particular formats, locations, fields, contextual data, etc. with particular information types. The system can store a correlation between an information type and one or more of a format, location, field, etc.

The centralized system can then receive an aviation record without a predetermined format. The system can identify a format of the overall aviation record, or information types of data within the unknown aviation record based on previous machine learning results. For example, a correlation between determined formats, locations, etc. can be stored with particular information types.

In one example, the centralized system is configured to determine a format of an aviation record received by a customer or supplier. The system applies machine learning as part of the quality assurance procedure to determine whether the aviation record format is valid.

In an embodiment, the centralized system 206 can receive a request from the one or more aviation customer servers 202a, 202b, 202n for an aviation record. The centralized system 206 can receive a request from the one or more aviation supplier servers 210a, 210b, 210m for an aviation record. The centralized system 206 can translate an aviation record, for example, the aviation record 208a, from the standardized format into a format expected by the requesting server, for example, the aviation supplier server 1 210a.

The centralized system 206 can perform a quality assurance procedure on the aviation records 204a, 204b, 204n, 208a, 208b, 208m after translating the aviation records 204a, 204b, 204n, 208a, 208b, 208m to ensure that the aviation records 204a, 204b, 204n, 208a, 208b, 208m are valid. If the quality assurance procedure indicates that an aviation record, such as the aviation record 208a, is invalid, then the centralized system 206 can create a notification and/or transmit a notification to the requesting server, such as the aviation supplier server 1 210a. If the quality assurance procedure indicates that an aviation record, such as the aviation record 208a, is valid, then the centralized system 206 can transmit the translated aviation record to the requesting server, such as the aviation supplier server 1 210a. The quality assurance procedure will be discussed in more detail below.

In an embodiment, the centralized system 206 can receive an instruction to forward an aviation record from an aviation customer server to an aviation supplier server. For example, the aviation customer server 1 202a can send an aviation record to the centralized system 206 with instructions for the centralized system to forward the aviation record to the aviation supplier server 2 210b. In an embodiment, the aviation customer server 1 202a can refer to the aviation supplier server 2 210b via a location, such as a uniform resource identifier (URL), an Internet Protocol (IP address), a media access control (MAC) address, etc. In another embodiment, the aviation customer server 1 202a can refer to the aviation supplier server 2 210b via an alias (such as a company name, a branch name, etc.), and the centralized system 206 can use the alias to determine a location. For example, the alias can be a key in a lookup table.

The centralized system 206 can translate the aviation record received from the aviation customer server 1 202a from Format 1 into the standardized format. The centralized system 206 can then translate the aviation record from the standardized format into Format 2, before forwarding the aviation record in Format 2 to the aviation supplier server 2 210b. In an embodiment, the formats of the aviation record can be specified in a message by the aviation customer server 1 202a. In another embodiment, the formats used by the aviation customer server 1 202a and the aviation supplier server 2 210b can be derived by the centralized system 206. For example, the centralized system 206 can derive that aviation customer server 1 202a uses Format 1 by parsing the aviation record, and the centralized system 206 can derive that aviation supplier server 2 210b uses Format 2 by parsing a previous aviation record that the centralized system 206 received from the aviation supplier server 2 210b. In another embodiment, when each server (the aviation customer servers 202a-202n and the aviation supplier servers 210a-210m) is integrated with the centralized system 206, each server can specify a format.

In a further embodiment, a format can be one of a plurality of predefined formats. When a server specifies a format that is one of the plurality of predefined formats, messages from that server can be forwarded to a translator dedicated to translating aviation records from the specified format into the standard format. Similarly, when a server specifies a format that is one of the plurality of predefined formats, messages addressed to that server can be forwarded to a translator dedicated to translating aviation records from the standard format into the specified format. Examples of predefined formats include formats provided by AMOS, Ramco, SAP, MXI, Ultramain, Oracle, etc. In another further embodiment, a format can be a proprietary format or a public, industry standard format such as SPEC2000 or SPEC2500. When a server specifies a format that is proprietary, messages from that server can be forwarded to a translator specially created to translate aviation records from the proprietary format into the standard format. Similarly, when a server specifies a format that is proprietary, messages addressed to that server can be forwarded to a translator specially created to translate aviation records from the standard format into the proprietary format.

Format translation can involve changing a location of fields, changing field delimiters, changing naming conventions for fields (e.g., SB72-0001r1 in one format can be SB72-0001rev1 in another format), etc. Each server (the aviation customer servers 202a-202n and the aviation supplier servers 210a-210m) can send an aviation record to every other server (the aviation customer servers 202a-202n and the aviation supplier servers 210a-210m) via the centralized system 206. Each server (the aviation customer servers 202a-202n and the aviation supplier servers 210a-210m) can receive an aviation record from every other server (the aviation customer servers 202a-202n and the aviation supplier servers 210a-210m) via the centralized system 206.

In some embodiments, the system determines the format of an aviation record based on machine learning of historical data. The historical data may include or be determined from earlier received aviation records. Previously received records are analyzed to identify a format of the records. The machine learning results are applied to determine the formation or other information associated with unknown records.

The centralized system 206 can use the stored aviation records to create a profile (e.g., history, report, etc.) for each component. The profile of a component can be created based on the stored aviation records associated with the component. The centralized system 206 can use machine learning techniques to determine if a profile is complete. When a profile is not complete, the centralized system 206 can determine which one or more parties are likely in possession of the information needed to fill gaps in the profile. The centralized system 206 can send a request for aviation records with information to fill the gaps in the profile to the one or more determined parties. The centralized system 206 can group the component profiles by one or more criteria, such as current installation, past installation, asset hierarchy, component type, brand, type of airplane for which the component is appropriate, the like, and/or a combination of the foregoing. The centralized system 206 can use machine learning techniques to make determinations about the groups. For example, the centralized system 206 can determine how a brand of a particular component performs, how long a brand of a particular component performs, if an expected life of a component should be updated, how maintenance routines affect a component's performance and/or life expectancy, the like, and/or a combination of the foregoing.

When the centralized system 206 either receives an aviation record or receives a request for an aviation record, a quality assurance procedure can be performed on the aviation record. The quality assurance procedure can check the syntax of the aviation record. For example, if a field of numbers contains anything other than a number, the quality assurance procedure can determine that the aviation record is invalid. The quality assurance procedure can check for consistency with a profile associated with the aviation record. For example, if an aviation record contains a maintenance item that is inconsistent with the type of component (e.g., repairing a consumable part, etc.) or is inconsistent with a current point in a lifecycle of the component (e.g., utilization beyond a life limit, etc.), then the quality assurance procedure can determine that the aviation record is invalid. In another example, the aviation record can indicate that a component (replacement component) associated with the aviation record is intended to replace another component (replaced component). Under such circumstances, the quality assurance procedure can determine if the replacement component is appropriate to replace the replaced component, and, if not, determine that the aviation record is invalid. In an embodiment, the quality assurance procedure can check to see that the aviation record is consistent with a group associated with the aviation record. For example, if a group is associated with a brand and an airline is determined to not use the brand, and the aviation record as associated with the group and the airline, then the quality assurance procedure can determine that the aviation record is invalid. In some embodiments, when an aviation record is determined to be invalid, then a prompt can be presented to a user to override the invalidity determination and proceed as if the aviation record were determined to be valid.

In an embodiment, the quality assurance procedure can include a user aspect. For example, after sending an aviation record to the centralized system 206, a user can retrieve the aviation record from the centralized system 206 and confirm that the retrieved aviation record is consistent with (e.g., the same as) the aviation record sent to the centralized system 206. On inspection by the user, the user can confirm (or raise an issue with) the aviation record provided by the centralized system. Further, a user, such as an aviation customer, can review an aviation record provided by an aviation supplier to ensure that the work requested and/or part installed as indicated in the aviation record matches what was expected by the aviation customer.

In some embodiments, the system includes a user interface that provides at least a portion of the quality assurance procedure. For example, the user interface may provide a registered user with the ability to view differences between the records of two systems, such as between the records of the centralized system and a supplier or customer, or between the records of a customer and a supplier. The user interface may display differences between the aviation records sent from a first system and the aviation records sent from a second system. By way of example, the user interface may display the configuration of an aerial vehicle, complex assembly or part in a hierarchical structure. The interface can connect the digital documentation required for regulatory compliance to the component data that is displayed within the user interface.

In some embodiments, the system selectively translates and/or transmits aviation records based on the quality assurance operation. For example, the system can determine if an aviation record is valid in its received format as part of the quality assurance procedure. If the aviation record is valid, the system can translate the record into the standardized format. If the aviation record is invalid, the system can skip translating the record. A notification can be sent to the sending party to resolve discrepancies or other factors that caused the record to be determined to be invalid.

The centralized system 206 can be a single computing device or multiple computing devices. The centralized system 206 can include a single processor or multiple processors. The centralized system 206 can include a single executable module or multiple executable modules. The centralized system 206 can be in one location or distributed across multiple locations. For example, the procedure of translating formats can be performed in a module with the quality assurance procedure, in a module separate from the quality assurance procedure, by a same computing device as a computing device performing the quality assurance procedure, by a different computing device as a computing device performing the quality assurance procedure, etc. Additionally, each procedure for translating a different format can be on a different module, a different computing device, etc. The centralized system 206 can be a cloud-based system. The centralized system 206 can be implemented on one or more cloud-computing devices and/or one or more cloud-computing systems.

Figure 3:
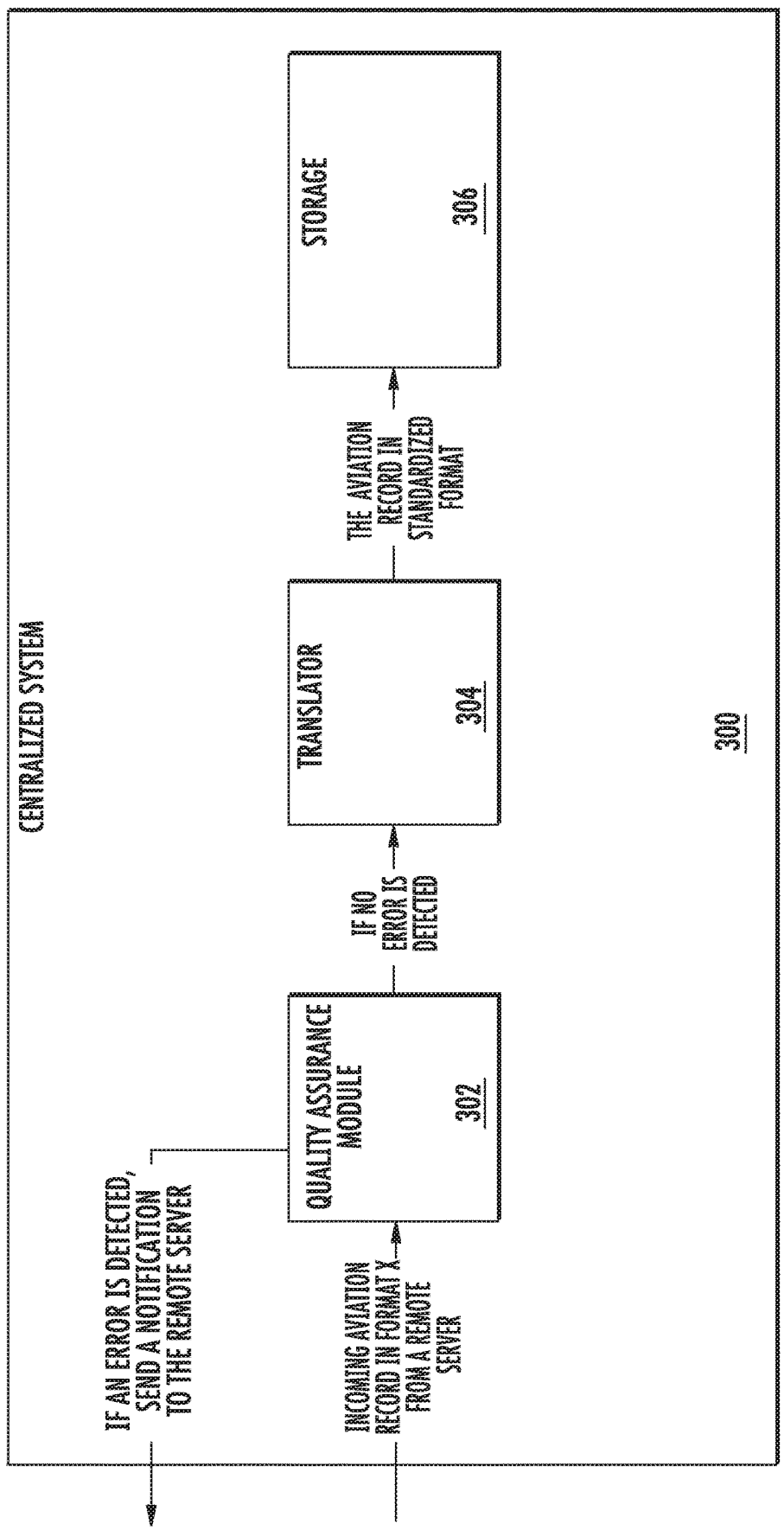
FIG. 3 depicts an example block diagram of a centralized system in accordance with example embodiments of the present disclosure.

FIG. 3 depicts an example block diagram of a centralized system 300 in accordance with example embodiments of the present disclosure. The centralized system 300 can receive an aviation record in format X from a remote server (e.g., computing system, computing device, etc.). The centralized system 300 can include a quality assurance module 302. In an embodiment, the centralized system 300 can include a single quality assurance module 302. In another embodiment, the centralized system 300 can include a quality assurance module 302 for each anticipated format. In yet another embodiment, the centralized system 300 can include any number of quality assurance modules 302 to handle the anticipated formats. The quality assurance module 302 can perform any of the quality assurance procedures discussed above on the aviation record. On detecting that the aviation record is invalid (e.g., detecting an error with the aviation record, etc.), a notification can be sent to the remote server.

In some embodiments, the quality assurance module 302 identifies a format of an incoming aviation record based on machine learning. The quality assurance module can identify an unknown format of an incoming record by determining that the record matches a structure or format of previously received records having a known format. In another example, the quality assurance module identifies information types of particular data within the incoming aviation record based on machine learning.

In some embodiments, the quality assurance module 302 applies machine learning to perform one or more quality assurance operations. For example, the module can combine historical data and validation constraints to determine whether a record or data within a record is valid, and/or to provide accuracy reports for the digital record. The historical data may include data from previously received and/or processed aviation records.

The centralized system 300 can include a translator 304. The quality assurance module 302 can pass (e.g., transfer, transmit, send, etc.) a valid aviation record (or an invalid aviation record that has been overridden) to the translator 304. The translator 304 can translate the aviation record from format X into a standardized format. In an embodiment, the centralized system 300 can include a single translator 304. In another embodiment, the centralized system 300 can include a translator 304 for each anticipated format. In yet another embodiment, the centralized system 300 can include any number of translators 304 to handle the anticipated formats.

In some embodiments, the translator is configured to translate aviation records from an unknown format into the standardized format. For example, the translator may apply machine learning to identify a format of an incoming aviation record and/or to identify information types associated with data within the aviation record.

The centralized system 300 can include storage 306. The translator 304 can pass the translated aviation record into storage 306. The storage 306 can include non-transitory computer-readable media, RAM, ROM, hard drives, flash drives, or other memory devices. The storage 306 can include the aviation records in the standardized format. The storage 306 can include cloud storage. The storage 306 can include a structured database, such as PostgreSQL. The storage 306 can include a NoSQL database, such as Cassandra.

Figure 4:
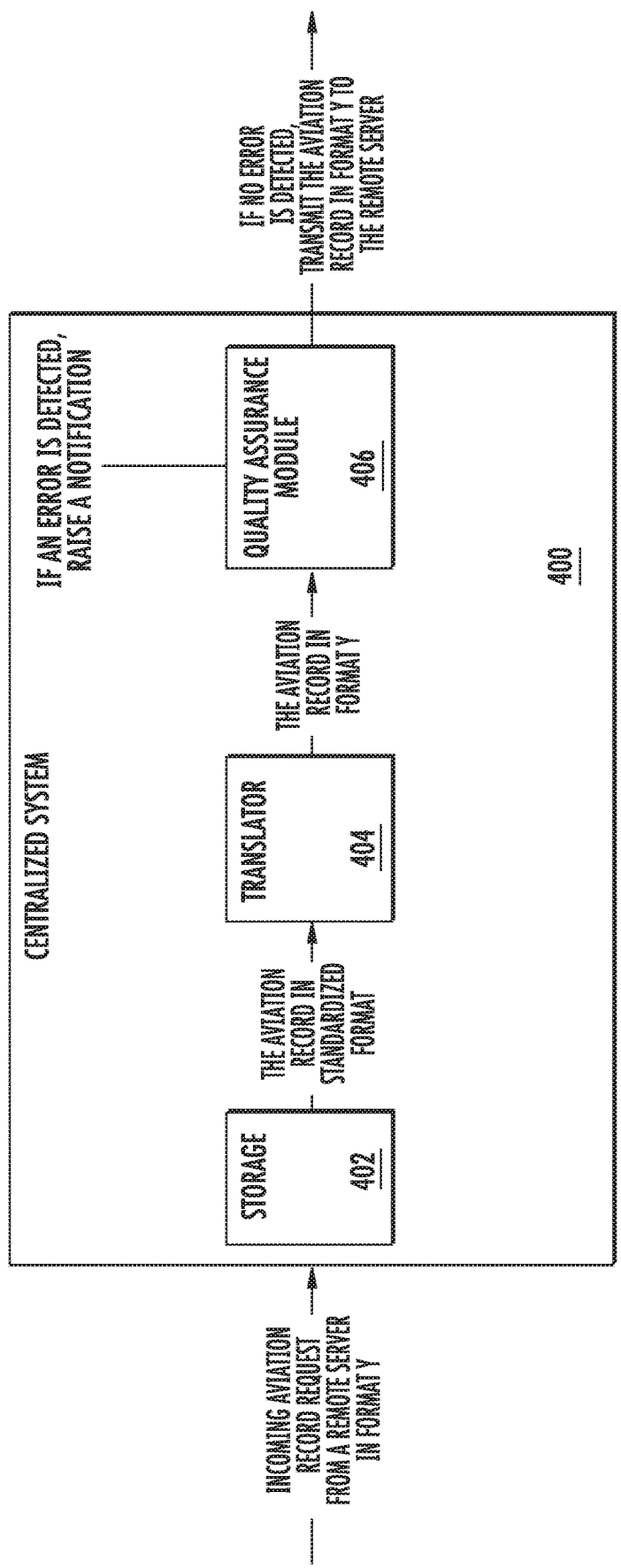
FIG. 4 depicts an example block diagram of a centralized system in accordance with example embodiments of the present disclosure.

FIG. 4 depicts an example block diagram of a centralized system 400 in accordance with example embodiments of the present disclosure. Like before, the centralized system 400 can include a storage 402, one or more translators 404, and one or more quality assurance modules 406. The centralized system 400 can be the same as the centralized system 300 discussed in FIG. 3. In an embodiment, the centralized system 400 can receive a request for an aviation record in format Y from a remote server (a receiving server). In another embodiment, the centralized system 400 can receive a request from a first remote server (a sending server) to forward an aviation record to a second remote server (a receiving server). In an embodiment, each remote server can specify a format when integrating with the centralized system 400. In an embodiment, a data structure in the centralized system 400 can map the receiving server with format Y. The aviation record in the standardized format can be pulled (e.g., retrieved, received, etc.) from the storage 402 and translated into the format Y by the one or more translators 404. The one or more quality assurance modules 406 can perform a quality assurance procedure on the aviation record in the format Y. On detecting that the aviation record is invalid (e.g., detecting an error with the aviation record, etc.), a notification can be created for the centralized server 400 and/or a notification can be sent to the receiving server. The one or more quality assurance modules 406 can perform any of the quality assurance procedures discussed above on the aviation record. The one or more quality assurance modules 406 can transfer a valid aviation record (or an invalid aviation record that has been overridden) to the receiving server.

In some embodiments, translator 404 is configured to translate aviation records from the standardized format into an unknown format. For example, the translator may not have predetermined information identifying a structure or format for format Y. The translator can apply machine learning to identify the appropriate structure, etc. of the format Y. For example, the translator may determine a structure for format Y by identifying other aviation records received from or sent to a receiving server. The translator can determine the format of the other aviation records using machine learning. The translator can translate the store record into format Y based on the learned structure of format Y.

Similarly, quality assurance module 406 is configured in some embodiments to perform quality assurance on records in an unknown format. For example, the quality assurance module can apply quality assurance to a record in an unknown format Y based on the structure of other records associated with the receiving server of the record.

In some embodiments, the system is configured to selectively transmit the aviation record in the unknown format Y based on the quality assurance procedure. If the aviation record is valid, the system can transmit the record to a remote server. If the aviation record is invalid, the system can transmit a notification to the remote server.

FIG. 5 depicts a flow diagram of an example method (500) for exchanging aviation records. The method of FIG. 5 can be implemented using, for instance, the centralized system 206 of FIG. 2 or the control system 800 of FIG. 9. FIG. 5 depicts operations performed in a particular order for purposes of illustration and discussion. Those of ordinary skill in the art, using the disclosures provided herein, will understand that various operations of any of the methods disclosed herein can be adapted, modified, rearranged, or modified in various ways without deviating from the scope of the present disclosure.

At (502), an aviation record in a first format can be received from a first computing system. For example, the centralized system 206 can receive an aviation record in a first format from a first computing system. In one embodiment, system 206 is configured to receive an aviation record without knowing the first format of the aviation record. The system can apply machine learning results to derive information about the aviation record or data within the aviation record. For example, the system can identify the record as being of a particular format based on a structure of the record, based on a sender identification, or contextual data associated with the record. The system can also or alternatively identify information types that are associated with particular data within an aviation record. The system can use machine learning results that provide a correlation between data and information types.

A quality assurance procedure can be performed on the received aviation record in the first format. For example, the centralized system 206 can perform a quality assurance procedure on the received aviation record in the first format.

The quality assurance procedure can determine if the received aviation record in the first format is valid. In some embodiment, the quality assurance procedure includes machine learning to analyze records and determine what comprises a complete record or component history. In some embodiment, the quality assurance procedure includes machine learning to determine whether an aviation record in the first format is valid. For example, the quality assurance procedure can compare the aviation record with information learned from earlier processed aviation records.

When the quality assurance procedure determines that the received aviation record in the first format is not valid, a notification can be transmitted to the first computing system. For example, when the quality assurance procedure determines that the received aviation record in the first format is not valid, the centralized system 206 can transmit a notification to the first computing system.

When the quality assurance procedure determines that the received aviation record in the first format is valid, the method 500 can proceed to (504). The quality assurance procedure can ensure that a syntax of the received aviation record matches an expected syntax of the first format.

In an embodiment, receiving an aviation record can include receiving a message including an aviation record. In an embodiment, the message can include a destination location. The destination location can be associated with a receiving computing system. The destination location can be a uniform resource identifier (URL), an Internet Protocol (IP address), a media access control (MAC) address, etc. The destination location can be an alias. The alias can be a company name, a branch name, etc. The centralized system 206 can use a data structure, such as a look up table, to determine an actual location of the receiving computing system based on an alias.

At (504), the aviation record can be translated into a second format. For example, the centralized system 206 can translate the aviation record into a second format. The second format can be a format in accordance with a standard. The centralized system 206 can use a data structure, such as a look up table, to determine a format used by the first computing system. The centralized system 206 can parse the aviation record to determine a format used by the first computing system. The centralized system 206 can determine a translator appropriate for translating the aviation record from the determined format into the second format.

At (506), the aviation record can be stored in the second format. For example, the centralized system 206 can store the aviation record in the second format. Optionally, at (508), a request for the aviation record in a third format can be received from a second computing system. For example, the centralized system 206 can receive a request for the aviation record in a third format from a second computing system. Alternatively, the centralized system 206 can determine a second computing system based on the received destination location.

At (510), the aviation record can be translated into the third format. For example, the centralized system 206 can translate the aviation record into the third format. The centralized system 206 can use a data structure, such as a look up table, to determine a format used by the second computing system. In another example, the centralized system can use machine learning to determine a format used by the second computing system. The centralized system 206 can determine a translator appropriate for translating the aviation record from the second format into the determined format. In one example, the centralized system 206 can determine an appropriate translator by applying machine learning.

At (512), the aviation record in the third format can be transmitted to the second computing system. For example, the centralized system 206 can transmit the aviation record in the third format to the second computing system.

In some embodiments, one or more of the first computing system and the second computing system can be operated by an aviation customer. In an embodiment, one or more of the first computing system and the second computing system can be operated by an airline and/or an aerial vehicle lessor. In an embodiment, one or more of the first computing system and the second computing system can be operated by an aviation supplier. In an embodiment, one or more of the first computing system and the second computing system can be operated by a maintenance, repair, and overhaul (MRO) entity and/or an original equipment manufacturer (OEM).

A quality assurance procedure can be performed on the aviation record in the third format. For example, the centralized system 206 can perform a quality assurance procedure on the aviation record in the third format. The quality assurance procedure can determine if the aviation record in the third format is valid. When the quality assurance procedure determines that the aviation record in the third format is not valid, a notification can be created. For example, when the quality assurance procedure determines that the aviation record in the third format is not valid, the centralized system 206 can create a notification. The notification can be sent to a user of the centralized system 206 and/or the second computing system. When the quality assurance procedure determines that the aviation record in the third format is valid, the aviation record in the third format can be transmitted to the second computing system. For example, when the quality assurance procedure determines that the aviation record in the third format is valid, the centralized system 206 can transmit the aviation record in the third format to the second computing system. The quality assurance procedure can ensure that a syntax of the aviation record matches an expected syntax of the third format. In some embodiments, the system determines whether the record in the third format is valid, for example, based on machine learning. The system selectively transmits the record in the third format based on the whether the record is valid.

Figure 6:
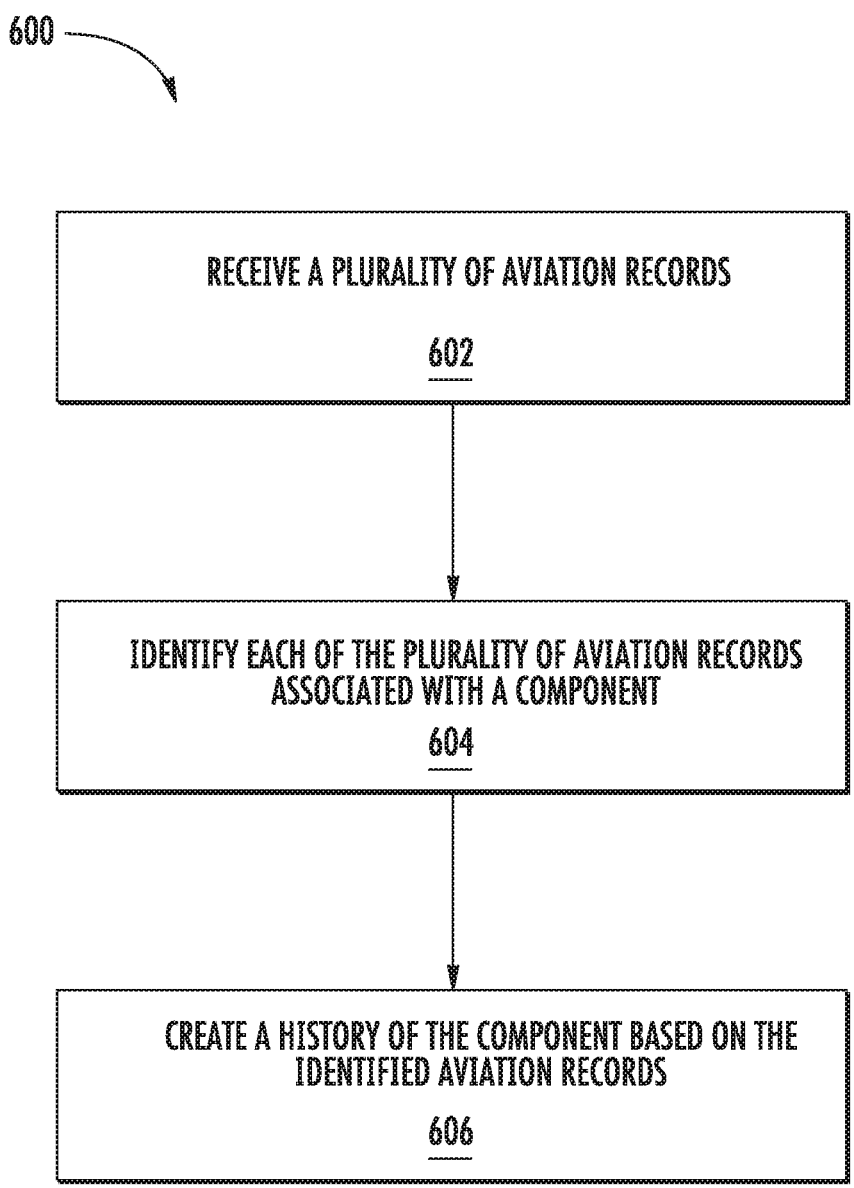
FIG. 6 depicts a flow diagram of an example method according to example embodiments of the present disclosure.

FIG. 6 depicts a flow diagram of an example method (600) for managing aviation records. The method of FIG. 6 can be implemented using, for instance, the centralized system 206 of FIG. 2 or the control system 800 of FIG. 9. FIG. 6 depicts operations performed in a particular order for purposes of illustration and discussion. Those of ordinary skill in the art, using the disclosures provided herein, will understand that various operations of any of the methods disclosed herein can be adapted, modified, rearranged, or modified in various ways without deviating from the scope of the present disclosure.

At (602), a plurality of aviation records can be received. For example, the centralized system 206 can receive a plurality of aviation records. At (604), each of the plurality of aviation records associated with a component can be identified. For example, the centralized system 206 can identify each of the plurality of aviation records associated with a component. At (606), a history of the component can be created based on the identified aviation records. For example, the centralized system 206 can create a history of the component based on the identified aviation records.

Optionally, block 604 can include applying one or more machine learning algorithms to identify aviation records associated with a component. For example, the system can identify a component with which a record is associated based on applied information from previously analyzed records. The system can determine that information within a record is similar to or otherwise is associated with information in previously analyzed records. Based on the correspondence between information, the system can determine that the current aviation record is associated with the same component as the earlier records. In an example, the system uses contextual data such as aircraft or an airline with which a record is associated to determine a component to which the record corresponds.

Optionally, one or more gaps in the history of the component can be identified. For example, the centralized system 206 can identify one or more gaps in the history of the component. One or more parties associated with the component can be determined. For example, the centralized system 206 can determine one or more parties associated with the component. One or more requests to fill the one or more gaps in the history of the component can be transmitted to the one or more determined parties associated with the component. For example, the centralized system 206 can transmit one or more requests to fill the one or more gaps in the history of the component to the one or more determined parties associated with the component.

Optionally, information to fill at least one of the identified gaps in the history of the component can be received from at least one of the determined parties associated with the component. For example, the centralized system 206 can receive information to fill at least one of the identified gaps in the history of the component from at least one of the determined parties associated with the component. The history of the component can be updated to fill the at least one gap in the history of the component with the information received from the at least one party associated with the component. For example, the centralized system 206 can update the history of the component to fill the at least one gap in the history of the component with the information received from the at least one party associated with the component. Optionally, information to fill the identified gaps in the history of the component can be received from at least one of the determined parties associated with the component. For example, the centralized system 206 can receive information to fill the identified gaps in the history of the component from at least one of the determined parties associated with the component. The history of the component can be completed to fill the gaps in the history of the component with the information received from the at least one party associated with the component. For example, the centralized system 206 can complete the history of the component to fill the gaps in the history of the component with the information received from the at least one party associated with the component. Optionally, a remaining life of the component can be estimated based on the history of the component. For example, the centralized system 206 can estimate a remaining life of the component based on the history of the component.

Optionally, a new aviation record can be received from a remote computing system. For example, the centralized system 206 can receive a new aviation record from a remote computing system. A determination can be made that the new aviation record is associated with the component. For example, the centralized system 206 can determine that the new aviation record is associated with the component. The history of the component can be updated based on the new aviation record. For example, the centralized system 206 can update the history of the component based on the new aviation record. A quality assurance procedure can be performed on the new aviation record. For example, the centralized system 206 can perform a quality assurance procedure on the new aviation record. The quality assurance procedure can determine if the new aviation record is valid. When the quality assurance procedure determines that the new aviation record is not valid, a notification can be transmitted to the remote computing system. For example, when the quality assurance procedure determines that the new aviation record is not valid, the centralized system 206 can transmit a notification to the remote computing system. When the quality assurance procedure determines that the new aviation record is valid, the method can proceed. The quality assurance procedure can ensure that each field of the new aviation record is consistent with the history of the component.

Figure 7:
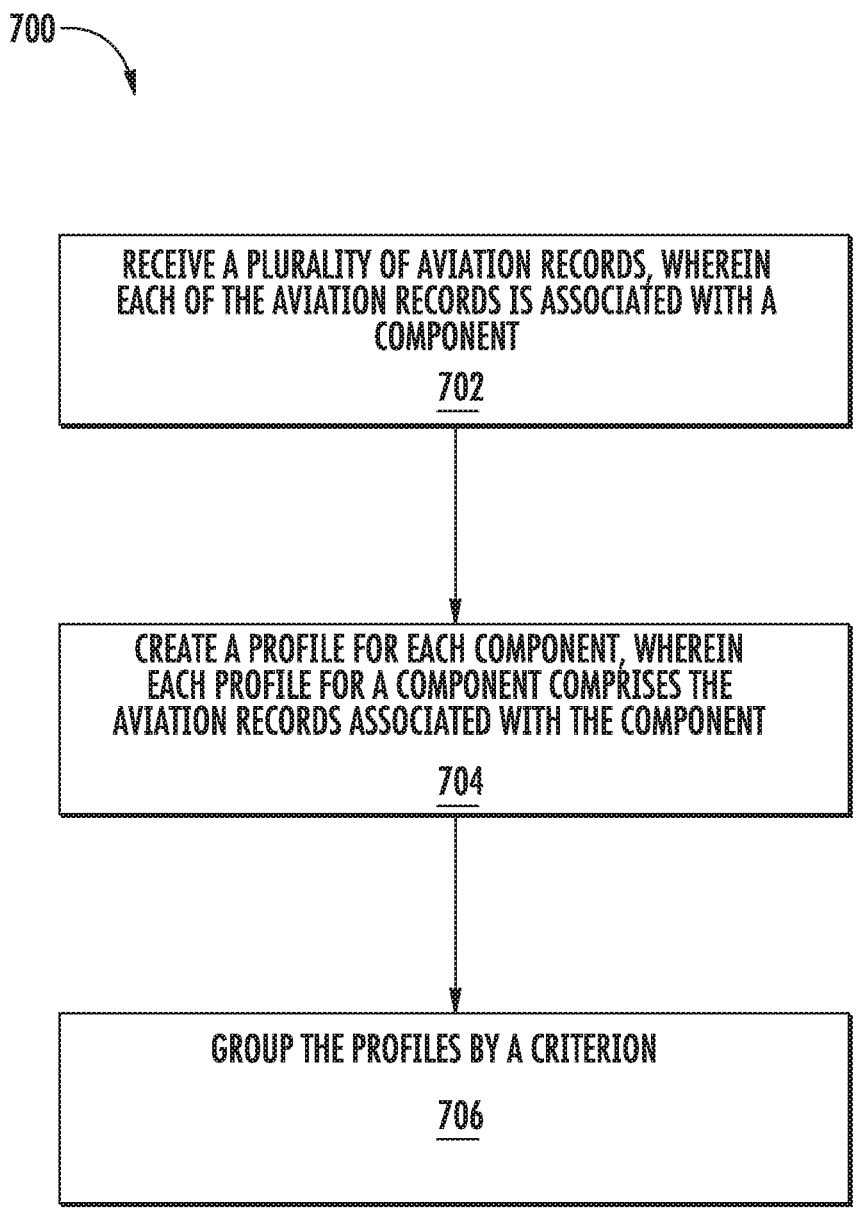
FIG. 7 depicts a flow diagram of an example method according to example embodiments of the present disclosure.

FIG. 7 depicts a flow diagram of an example method (700) for managing aviation records. The method of FIG. 7 can be implemented using, for instance, the centralized system 206 of FIG. 2 or the control system 800 of FIG. 9. FIG. 7 depicts operations performed in a particular order for purposes of illustration and discussion. Those of ordinary skill in the art, using the disclosures provided herein, will understand that various operations of any of the methods disclosed herein can be adapted, modified, rearranged, or modified in various ways without deviating from the scope of the present disclosure.

At (702), a plurality of aviation records can be received. For example, the centralized system 206 can receive a plurality of aviation records. Each of the aviation records can be associated with a component. At (704), a profile can be created for each component. For example, the centralized system 206 can create a profile for each component. Each profile for a component can include the aviation records associated with the component.

At (706), the profiles can be grouped by a criterion. For example, the centralized system 206 can group the profiles by a criterion. The criterion can be a type of component. Each profile in a group can be associated with a same type of component. The criterion can be a current installation, a past installation, an asset hierarchy, a brand, a type of airplane the component is appropriate for, the like, and/or a combination of the foregoing. A performance of each component in a group of profiles can be analyzed based on the profiles associated with the group of profiles. For example, the centralized system 206 can analyze a performance of each component in a group of profiles based on the profiles associated with the group of profiles. An expected life of the type of component associated with the group can be updated based on the analyzed performances. For example, the centralized system 206 can update an expected life of the type of component associated with the group based on the analyzed performances.

Optionally, a new aviation record can be received from a remote computing system. For example, the centralized system 206 can receive a new aviation record from a remote computing system. A replacement component associated with the new aviation record can be to replace an old component associated with an old profile. A determination can be made of if the replacement component is appropriate to replace the old component based on the old profile. For example, the centralized system 206 can determine if the replacement component is appropriate to replace the old component based on the old profile. When the replacement component is determined to not be appropriate to replace the old component, a notification can be transmitted to the remote computing system. For example, when the replacement component is determined to not be appropriate to replace the old component, the centralized system 206 can transmit a notification to the remote computing system. When the replacement component is determined to be appropriate to replace the old component, a new profile associated with the replacement part can be created. For example, when the replacement component is determined to be appropriate to replace the old component, the centralized system 206 can create a new profile associated with the replacement part.

Figure 8:
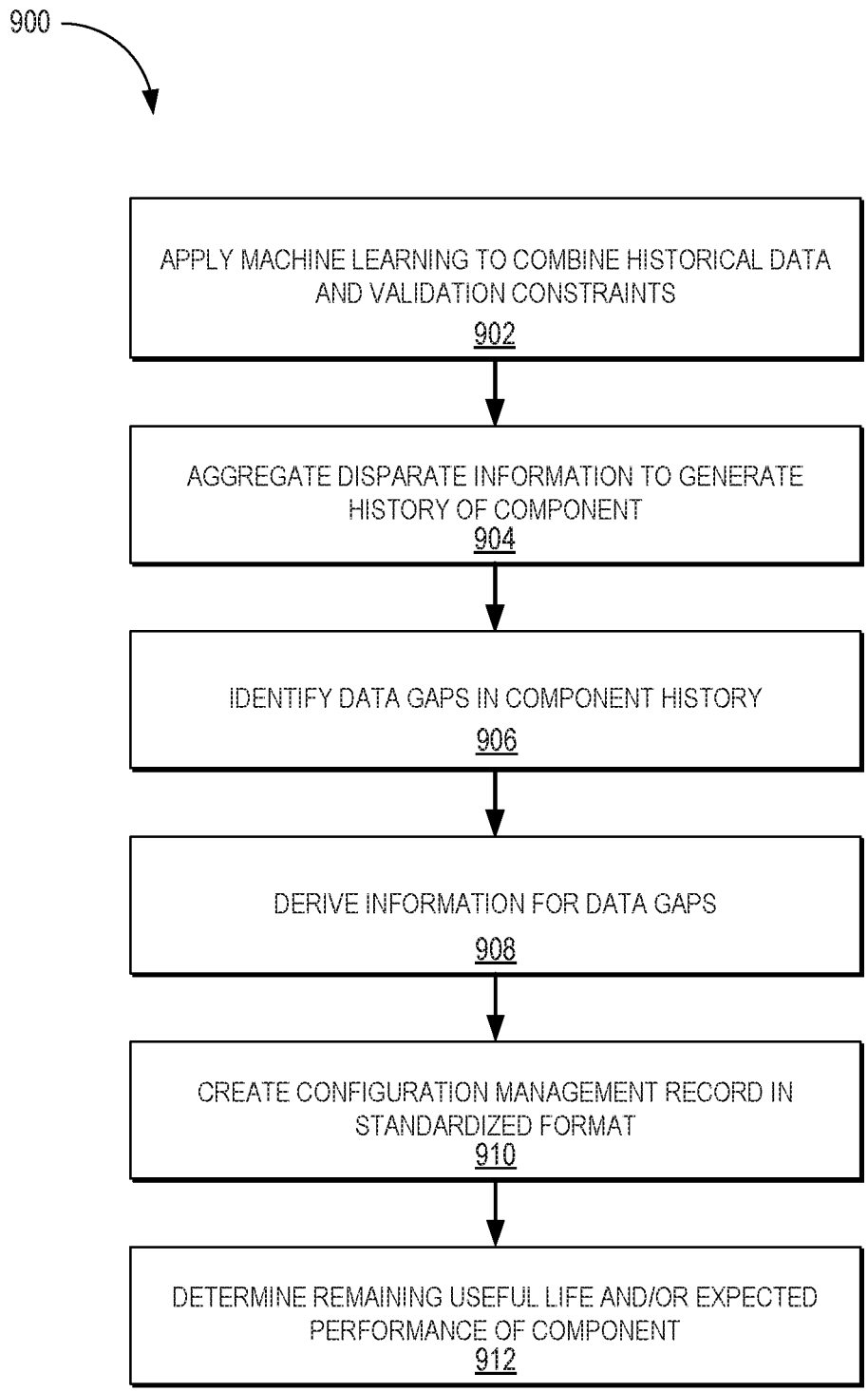
FIG. 8 depicts a flow diagram of an example method according to example embodiments of the present disclosure.

FIG. 8 depicts a flow diagram of an example method (900) for managing aviation records. The method of FIG. 8 can be implemented using, for instance, the centralized system 206 of FIG. 2 or the control system 800 of FIG. 9. FIG. 8 depicts operations performed in a particular order for purposes of illustration and discussion. Those of ordinary skill in the art, using the disclosures provided herein, will understand that various operations of any of the methods disclosed herein can be adapted, modified, rearranged, or modified in various ways without deviating from the scope of the present disclosure. In example embodiments, method 900 can be performed at or as part of blocks 604 and/or 606 of method 600 of FIG. 6, or at or as part of blocks 704 and/or 706 of method 700 of FIG. 7.

At (902), machine learning is applied to historical data and optionally validation constraints associated with a component. For example, system 206 can combine historical data to identify a format or other structural information of records associated with the component. Block 902 may include identifying an airline or an aircraft associated with the component. Block 902 may include identifying fields, locations, structures, data formats, etc. of records associated with the component. The historical data can be used to generate an accuracy report or an identifier of the features for the component or records associated with the component. Block 902 may include performing a quality assurance procedure based on machine learning of the historical data. The quality assurance procedure applies the machine learning results to determine whether the format of received aviation records is valid. If the format is invalid, the system can provide a user interface to resolve the invalidity.

At (904), information from a plurality of aviation records corresponding to a component are aggregated to generate a history of the component. Block 904 includes application of the machine learning results of block 902 in one example. For example, block 902 may include identifying a component associated with an aviation record. Block 902 may include identifying a subset of a plurality of aviation records that correspond to a particular component and/or component type. Block 902 may include identifying a format of an aviation record without a format predetermined by the system. The system can apply the machine learning results to identify a format of a record based on a correspondence with records for which the format is known or has been determined using machine learning. In an example, block 904 can include determining a component or format of an aviation record based on contextual data, such as an airline or aircraft associated with the record. In one example, block 904 can be performed to generate a profile for each component that includes the aggregated aviation records corresponding to the component.

At (906), gaps in the component history can be identified. In one example, machine learning is used to determine what comprises a full component history for a particular component type. At 906, the system can determine if the aggregated information for the history of the component is complete.

At (908), information to complete any identified gaps in the component history is derived. Block 908 can include determining the information as previously described. For example, the system may determine one or more parties that may have the information and generate requests to receive the information. In one embodiment, block 908 includes the application of machine learning to identify parties that may have the missing information.

At (910), a configuration management record for the component is created in a standardized format based on the aggregated record information. Block 910 may include combining data of a common data type to provide a representation of the how the data has changed over time for the component. The configuration management record can provide a full history of a component which is derived from airline records having disparate formats and information types. In some embodiments, machine learning is used to combine data from different sources and to generate a standardized representation of the component history.

At (912), a remaining useful life and/or expected performance of the component is optionally determined. The configuration management record provides a full component configuration history. Multiple systems of record are aggregated to create a single holistic configuration management record. In this manner, the remaining useful life or expected performance of the component or system including the component can be forecasted.

Figure 9:
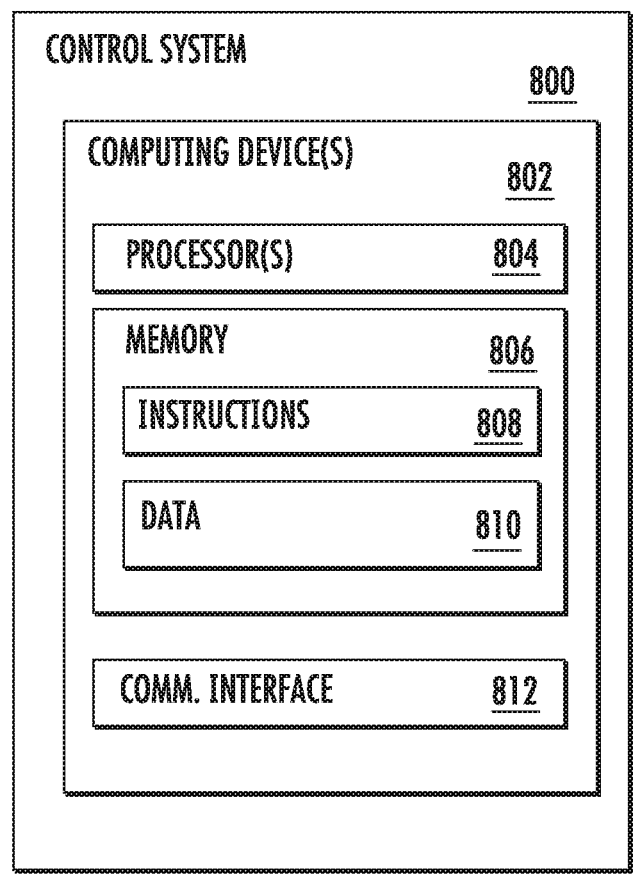
FIG. 9 depicts a computing system for implementing one or more aspects according to example embodiments of the present disclosure.

FIG. 9 depicts a block diagram of an example computing system that can be used to implement the control system 800 or other systems according to example embodiments of the present disclosure. For example, the centralized system 206 can include one or more control systems 800. As shown, the control system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 806 that can be executed by the one or more processor(s) 804. The instructions 806 can be any set of instructions that when executed by the one or more processor(s) 804, cause the one or more processor(s) 804 to perform operations. The instructions 806 can be software written in any suitable programming language or can be implemented in hardware. In some embodiments, the instructions 806 can be executed by the one or more processor(s) 804 to cause the one or more processor(s) 804 to perform operations, such as the operations for managing and/or exchanging aviation records, as described with reference to FIG. 5, FIG. 6, FIG. 7, and/or FIG. 8.

The memory device(s) 806 can further store data 810 that can be accessed by the processors 804. For example, the data 810 can include aviation records and/or data from any other suitable component of an airplane and/or aviation customer (e.g., airline, aerial lessor, etc.) and/or aviation supplier (e.g., MRO entity, OEM, etc.), as described herein. The data 810 can include one or more table(s), function(s), algorithm(s), model(s), equation(s), etc. for managing and/or exchanging aviation records according to example embodiments of the present disclosure.

The one or more computing device(s) 802 can also include a communication interface 812 used to communicate, for example, with the other components of the system and/or other computing devices. The communication interface 812 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system, comprising:
   one or more processors; and
   one or more memory devices, the one or more memory devices storing computer-readable instructions that when executed by the one or more processors cause the one or more processors to perform operations, the operations comprising:
      receiving, at one or more processors, an aviation record in a first format from a first computing system, the first format being an unknown format;
      performing, at the one more processors, a quality assurance procedure on the aviation record in the first format based at least in part on historical data associated with one or more components of one or more aerial vehicles, wherein performing the quality assurance operation comprises applying one or more machine learning operations to the aviation record in the first format to derive information relating to the aviation record using the historical data and one or more validation constraints so as to identify a component corresponding to the aviation record being in the unknown format;
      determining, at the one or more processors, whether the aviation record in the first format is valid based on the quality assurance procedure;
      selectively translating, at the one or more processors, the aviation record from the first format into a standardized format associated with the component identified as corresponding to the aviation record being in the unknown format based on whether the aviation record in the first format is valid and using the information relating to the aviation record derived by applying the one or more machine learning operations to the aviation record; and
      storing, at the one or more processors, the aviation record in the standardized format in response to a determination that the aviation record in the first format is valid.

2. The system of claim 1, wherein the quality assurance procedure ensures that a syntax of the received aviation record matches an expected syntax of the first format based on machine learning of the historical data.

3. The system of claim 2, wherein the operations further comprise:
   providing a user interface configured to display discrepancies between the aviation record in the first format and the aviation record in the standardized format.

4. The system of claim 1, wherein the operations further comprise:
   in response to the quality assurance procedure determining that the aviation record in the first format is not valid, transmitting a notification to the first computing system; and
   in response to the quality assurance procedure determining that the aviation record in the first format is valid, translating the aviation record into the standardized format.

5. The system of claim 1, wherein the operations further comprise:
   receiving, at the one or more processors, a request for the aviation record in a third format from a second computing system;
   translating, at the one or more processors, the aviation record into the third format;
   performing, at the one more processors, a quality assurance procedure on the aviation record in the third format based on machine learning of the historical data;
   determining, at the one or more processors, whether the aviation record in the third format is valid based on a result of the quality assurance procedure; and
   selectively transmitting, at the one or more processors, the aviation record in the third format to the second computing system.

6. The system of claim 5, wherein selectively transmitting the aviation record in the third format to the second computing system comprises:
   in response to the quality assurance procedure determining that the aviation record in the third format is not valid, transmitting a notification to the third computing system; and
   in response to the quality assurance procedure determining that the aviation record in the third format is valid, transmitting the aviation record in the third format to the second computing system.

7. The system of claim 6, wherein the quality assurance procedure ensures that a syntax of the aviation record matches an expected syntax of the third format based on machine learning of the historical data.

8. A method, comprising:
receiving, at one or more processors, a plurality of aviation records having a plurality of formats;
identifying, at the one or more processors, a subset of the plurality of aviation records associated with a component, wherein identifying the subset of the plurality of aviation records comprises performing, at the one or more processors, one or more machine learning operations to identify the subset of the plurality of aviation records associated with the component, wherein the subset of aviation records includes at least one aviation record in an unknown format, and wherein a format of the at least one record in the unknown format is identified based on a correspondence with aviation records for which the format is known or has been determined using machine learning;
applying, at the one or more processors, machine learning to aggregate information from the subset of aviation records into a standardized format, wherein the subset of aviation records includes two or more aviation records having different formats; and
creating, at the one or more processors, a configuration management record that identifies a history of the component using the standardized format for the information from the subset of aviation records.

9. The method of claim 8, wherein applying machine learning to aggregate information from the subset of aviation records comprises:
performing, at the one or more processors, one or more machine learning operations to combine historical data associated with the component with one or more validation constraints.

10. The method of claim 8, further comprising:
identifying, at the one or more processors, one or more gaps in the history of the component;
determining, at the one or more processors, one or more parties associated with the component; and
transmitting, at the one or more processors, one or more requests to fill the one or more gaps in the history of the component to the one or more parties associated with the component.

11. The method of claim 10, further comprising:
receiving, at the one or more processors, information to fill at least one of the identified gaps in the history of the component from at least one of the one or more parties associated with the component; and
updating, at the one or more processors, the history of the component to fill the at least one gap in the history of the component with the information received from the at least one of the one or more parties associated with the component.

12. The method of claim 8, further comprising:
estimating, at the one or more processors, a remaining life of the component based on the history of the component.

13. The method of claim 8, further comprising:
receiving, at the one or more processors, a new aviation record from a remote computing system;
determining, at the one or more processors, that the new aviation record is associated with the component; and
updating, at the one or more processors, the history of the component based on the new aviation record.

14. The method of claim 13, wherein receiving the new aviation record from the remote computing system further comprises:
performing a quality assurance procedure on the new aviation record based on machine learning of historical data associated with the component, wherein the quality assurance procedure determines if the new aviation record is valid;
in response to the quality assurance procedure determining that the new aviation record is not valid, transmitting a notification to the remote computing system; and
in response to the quality assurance procedure determining that the new aviation record is valid, updating the history of the component;
wherein the quality assurance procedure ensures that each field of the new aviation record is consistent with the history of the component.

15. A non-transitory computer-readable medium storing computer instructions, that when executed by one or more processors, cause the one or more processors to perform operations, the operations comprising:
receiving, at one or more processors, a plurality of aviation records associated with a plurality of components;
applying, at the one or more processors, machine learning to identify for each component a subset of the plurality of aviation records corresponding to the component, wherein at least one of the subset of aviation records includes at least one aviation record in an unknown format, and wherein a format of the at least one record in the unknown format is identified based on a correspondence with aviation records for which the format is known or has been determined using machine learning; and
creating, at the one or more processors, a profile for each component based on aggregating the aviation records from a corresponding subset associated with the component.

16. The non-transitory computer-readable medium of claim 15, wherein the operations further comprise:
generating, at the one or more processors, a plurality of profile groups by grouping profiles having a common component type.

17. The non-transitory computer-readable medium of claim 16, wherein the operations further comprise:
analyzing, at the one or more processors, a performance of each component in a group of profiles based on the profiles associated with the group; and
updating, at the one or more processors, an expected life of the type of component associated with the group based on the performances of each component in the group.

18. The non-transitory computer-readable medium of claim 15, wherein the operations further comprise:
receiving, at the one or more processors, a new aviation record from a remote computing system, wherein a replacement component associated with the new aviation record is to replace an old component associated with an old profile;
determining, at the one or more processors, if the replacement component is appropriate to replace the old component based on the old profile;
in response to determining that the replacement component is not appropriate to replace the old component, transmitting a notification to the remote computing system; and
in response to determining that the replacement component is appropriate to replace the old component, creating, at the one or more processors, a new profile associated with the replacement part.

* * * * *